United States Patent [19]

Tropeano et al.

[11] Patent Number: 4,541,250
[45] Date of Patent: * Sep. 17, 1985

[54] METHOD AND APPARATUS FOR PRODUCING SNOW AT MARGINAL AMBIENT TEMPERATURES AND ELIMINATING COMPRESSED AIR LINE FREEZE-UP AND OIL CONTAMINATION

[76] Inventors: Tropeano, Joseph C.; Joseph T. Tropeano; Thomas F. Tropeano, all of 12 Revere St., Lexington, Mass. 02173

[*] Notice: The portion of the term of this patent subsequent to Aug. 28, 2001 has been disclaimed.

[21] Appl. No.: 602,020

[22] Filed: Apr. 19, 1984

Related U.S. Application Data

[63] Continuation-in-part of Ser. No. 457,259, Jan. 12, 1983, Pat. No. 4,467,614.

[51] Int. Cl.⁴ .................. F25D 17/04; B01D 53/26
[52] U.S. Cl. .................. 62/532; 62/124; 62/406; 55/82
[58] Field of Search .................. 62/304, 64, 121, 123, 62/124, 58, 317, 314, 514 R, 406; 55/82, 267, 222; 159/45

[56] References Cited

U.S. PATENT DOCUMENTS

| | | | |
|---|---|---|---|
| 2,676,471 | 4/1954 | Pierce | 62/304 |
| 3,942,330 | 3/1976 | Schroder | 62/93 |
| 4,187,325 | 2/1980 | Tyree, Jr. | 62/85 |
| 4,200,442 | 4/1980 | Willot | 62/91 X |
| 4,467,614 | 8/1984 | Tropeano | 62/112 X |

*Primary Examiner*—Henry Bennett
*Attorney, Agent, or Firm*—Bachman & LaPointe

[57] ABSTRACT

A method and apparatus for producing snow at marginal ambient temperatures while at the same time eliminating compressed air line freeze-up and oil contamination. Compressed air is delivered from a compressor to a cooling tower wherein oil particles and condensate are removed from the stream of compressed air. The oil particles and condensate-free compressed air stream is then delivered to a cryogenic unit wherein the air is contacted in heat exchange relationship with a liquefied gas so as to supercool the air stream which is then delivered to snow-making apparatus.

20 Claims, 4 Drawing Figures

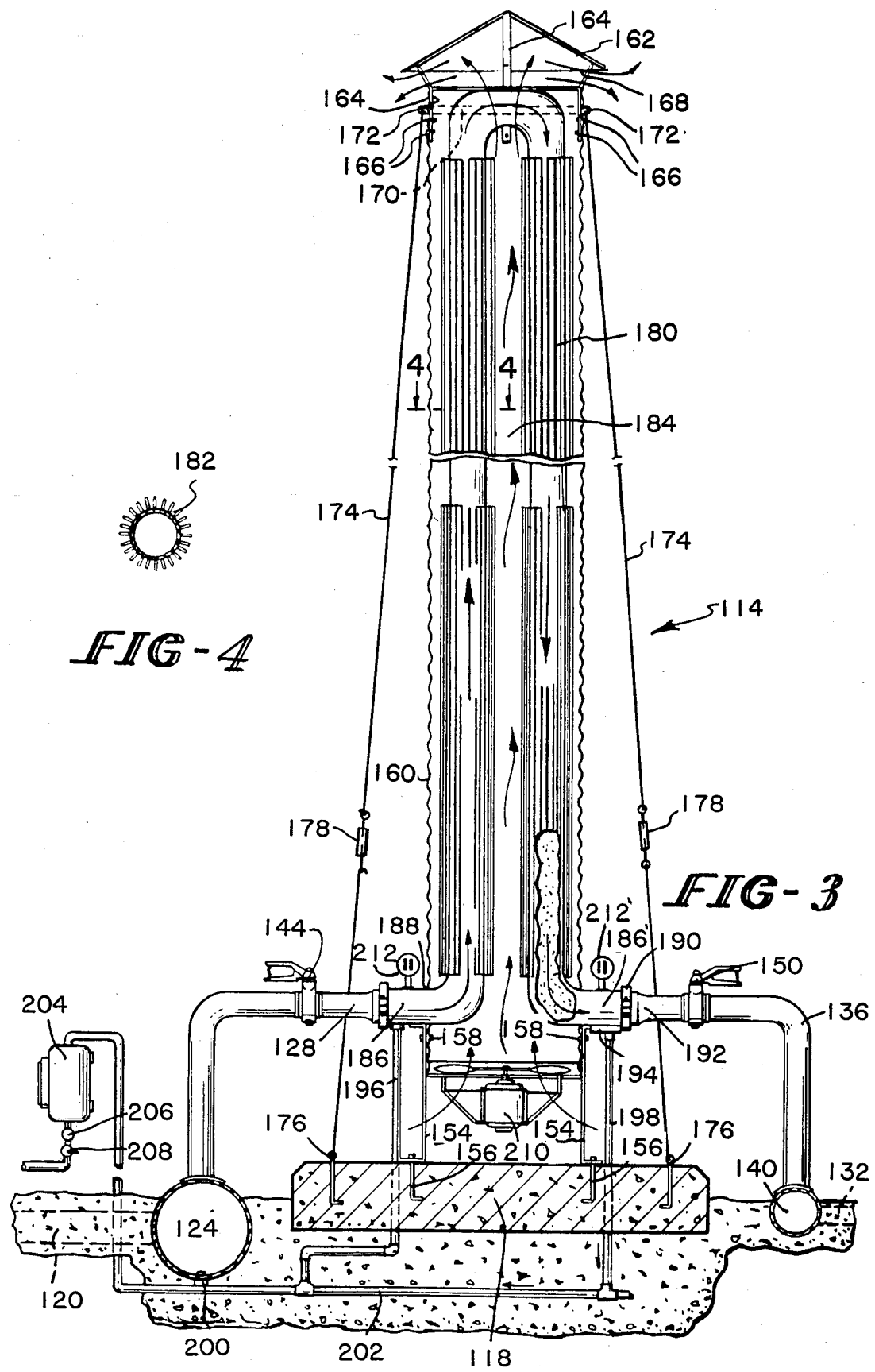

METHOD AND APPARATUS FOR PRODUCING SNOW AT MARGINAL AMBIENT TEMPERATURES AND ELIMINATING COMPRESSED AIR LINE FREEZE-UP AND OIL CONTAMINATION

CROSS REFERENCE TO RELATED APPLICATION

This application is a continuation-in-part of U.S. application Ser. No. 457,259, filed Jan. 12, 1983 now U.S. Pat. No. 4,467,614.

BACKGROUND OF THE INVENTION

The present invention resides in a method and apparatus for producing snow and, more particularly, a method and apparatus for producing snow at marginal ambient temperatures while, at the same time, eliminating compressed air line freeze-up and oil contamination.

In the snow-making art, it is well known to mix compressed air and pressurized water in a cold ambient atmosphere to produce a stream of snow particles. Typical snow-making apparatus are disclosed in U.S. Pat. Nos. 3,964,682 and 3,761,020, incorporated herein by reference, and comprise a plurality of snow-making nozzles which are fed compressed air and pressurized water through separate lines. The flow of compressed air and pressurized water to the nozzles of the snow-making apparatus are provided by conventional air compressors and water pump equipment. The compressors and pump equipment are generally located down the mountain far from the snow-making apparatus. The compressed air and pressurized water is fed to the snow-making apparatus via pipelines generally located beneath the surface of the earth. The pipelines connect to hoses which lead the compressed air and water respectively from the pipelines to the snow-making equipment nozzles. See for example U.S. Pat. No. 3,964,682.

Heretofore it has been extremely costly difficult to convert water into snow at marginal ambient temperatures, that is temperatures of about 30° to 32° F., due to the need of high volume costly compressed air. Presently, all known snowmakers rely on the ambient temperature and humidity for the amount of snow they can produce.

In addition, there has been a problem with line freeze-up in the hose delivering the compressed air from the pipeline to the nozzles. A further problem has been encountered with freezing of the nozzles themselves. It has been found that the freeze-up in the hose and nozzles occurs as a result of condensation which forms in the compressed air pipeline. The heat produced by the operation of the compressors results in a water condensate forming in the pipeline. The condensate freezes as it passes through the pipeline and hoses to the nozzles of the snow-making equipment due to the temperature of the ambient environment. Freezing of the hoses and nozzles requires that the snow-making equipment be shut down and thawed thereby resulting in lost snow production.

In addition to the foregoing, there has been a serious problem with oil in the compressed air pipeline. Oil is located in the compressor sump for the purpose of lubricating the moving parts of the compressor. During operation of the compressor a certain amount of the oil blows by the pistons of the compressors and is pumped with the compressed air into the compressed air pipeline. The oil particles are carried with the compressed air to the nozzles of the snow-making apparatus where it mixes with the snow and is spread on the ground. Later, when the snow melts, the oil is carried off with the water which results in oil contamination of the watersheds and streams.

Naturally, it would be highly desirable to develop a method and apparatus for producing snow which is efficient and effective even at marginal snow-making temperatures and does not suffer from line freeze-up and oil contamination.

Accordingly, it is a principal object of the present invention to provide a method and apparatus for producing snow which is efficient and effective at marginal snow-making temperatures.

It is a further principal object of the present invention to provide a method and apparatus for effectively removing oil particles and condensation from a stream of compressed air being fed to a snow-making apparatus.

It is a particular object of the present invention to provide an apparatus for making snow and removing oil particles and condensation from a stream of compressed air which is inexpensive and efficient to operate.

Further objects and advantages of the present invention will appear hereinbelow.

SUMMARY OF THE INVENTION

In accordance with the present invention, the foregoing objects and advantages are readily obtained.

The present invention resides in a method and apparatus for producing snow and, more particularly, a method and apparatus for producing snow at marginal ambient temperatures while, at the same time, eliminating compressed air line freeze-up and oil contamination. In accordance with the present invention, compressed air is delivered from a compressor to a cooling tower wherein oil particles and condensate are removed from the stream of compressed air and from the cooling tower to a cryogenic unit wherein the stream of compressed air is contacted in heat exchange relationship with liquid nitrogen. The precooled compressed air stream is then mixed with the spent nitrogen from the cryogenic unit and delivered to the snow-making apparatus. The cooling tower is provided with means for crystallizing the condensate. The oil particles in the air stream adhere to the crystallized condensate and are carried with the crystallized condensate by the flow of compressed air to a holding zone. The holding zone is heated so as to liquefy the crystallized condensate and the liquid and oil particles are separated from the stream of compressed air and are drained back to a holding tank. The cryogenic unit consists of a coil or star fin encased in a housing wherein the compressed air stream passes over the coil and star fin in heat exchange relationship with a liquefied gas such as hydrogen, oxygen and, preferably nitrogen which is pumped through the housing. Downstream of the cryogenic unit the nitrogen is mixed with the compressed air stream which is then fed to the snow-making equipment.

In accordance with particular features of the present invention a moisture separator and air dryer may be provided upstream of the cooling tower so as to remove 80 to 90% of the moisture prior to delivery of the compressed air stream to the cooling tower. Likewise, an aftercooler may be provided downstream of the tower and upstream of the cryogenic unit for precooling the stream of compressed air prior to delivery to the cryogenic unit.

By virtue of the method and apparatus of the present invention, water condensate which leads to freeze-up of the snow-making equipment is effectively removed. In addition, oil in the compressed air line is removed thus eliminating a potentially serious water contamination problem. Finally, a cooled stream of compressed air is delivered to the snow-making equipment at a temperature which is down to over 30° F. below the ambient temperature thereby assuring efficient and effective snow-making.

BRIEF DESCRIPTION OF THE DRAWINGS

FIG. 3 is a partial sectional side view taken along line 2—2 of FIG. 2 illustrating the cooling tower in accordance with the present invention.

FIG. 4 is a sectional view of the cooling pipe used in the cooling tower of the present invention taken along line 3—3 of FIG. 3.

DETAILED DESCRIPTION

Figure 1:
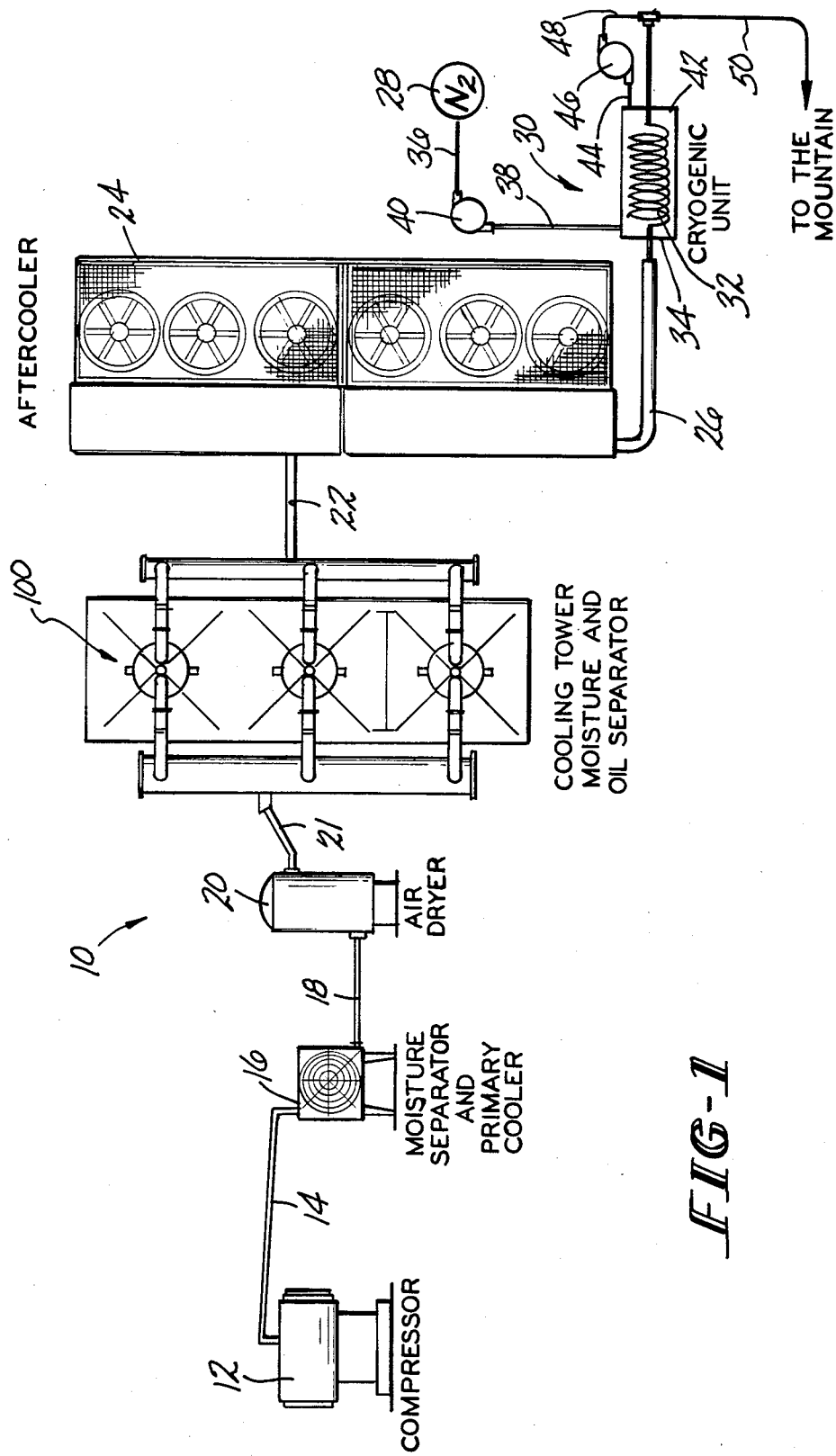
FIG. 1 is a schematic representation illustrating the method and apparatus of the present invention.

With reference to FIG. 1 an installation 10 in accordance with the present invention is illustrated. The installation 10 comprises a compressor unit 12 for feeding compressed air via line 14 to a moisture separator 16. The compressor unit 12 may be of any suitable type known in the art for use in snow-making. The moisture separator 16 may be of any known type such as that manufactured by Van Air Systems, Inc. From the moisture separator 16 the compressed air stream is delivered via line 18 to deliquescent air dryer 20 and from dryer 20 to the cooling tower installation 100 of the present invention via line 21. The deliquescent air dryer 20 is a conventionally known dryer such as that manufactured by Van Air Systems, Inc. From the cooling tower installation 100 the compressed air stream free of water and oil particles is fed to aftercooler 24 via line 22 where the stream is precooled and delivered via line 26 to cyrogenic unit 30. Cryogenic unit 30 consists of a coil fin pipe or star fin 32 for receiving the stream of compressed air from line 26. The coil 32 is encased in a housing 34 which is fed with liquid nitrogen or other suitable liquefied gas from a source 28 via lines 36 and 38 by means of pump 40. The nitrogen flows through the interior 42 of housing 34 in heat exchange relationship with coil 32 thereby cooling the stream of compressed air below ambient. The spent nitrogen is removed from unit 30 via line 44 by means of pump or pressurized cylinder 46 and is thereafter mixed with the compressed air stream in line 50 by delivery through line 48. The cooled compressed air stream with nitrogen is then delivered to the mountain and the snow-making equipment. The aftercooler 24 may be of any conventional type such as Model TCV3500 sold by Van Air Systems, Inc.

Figure 2:
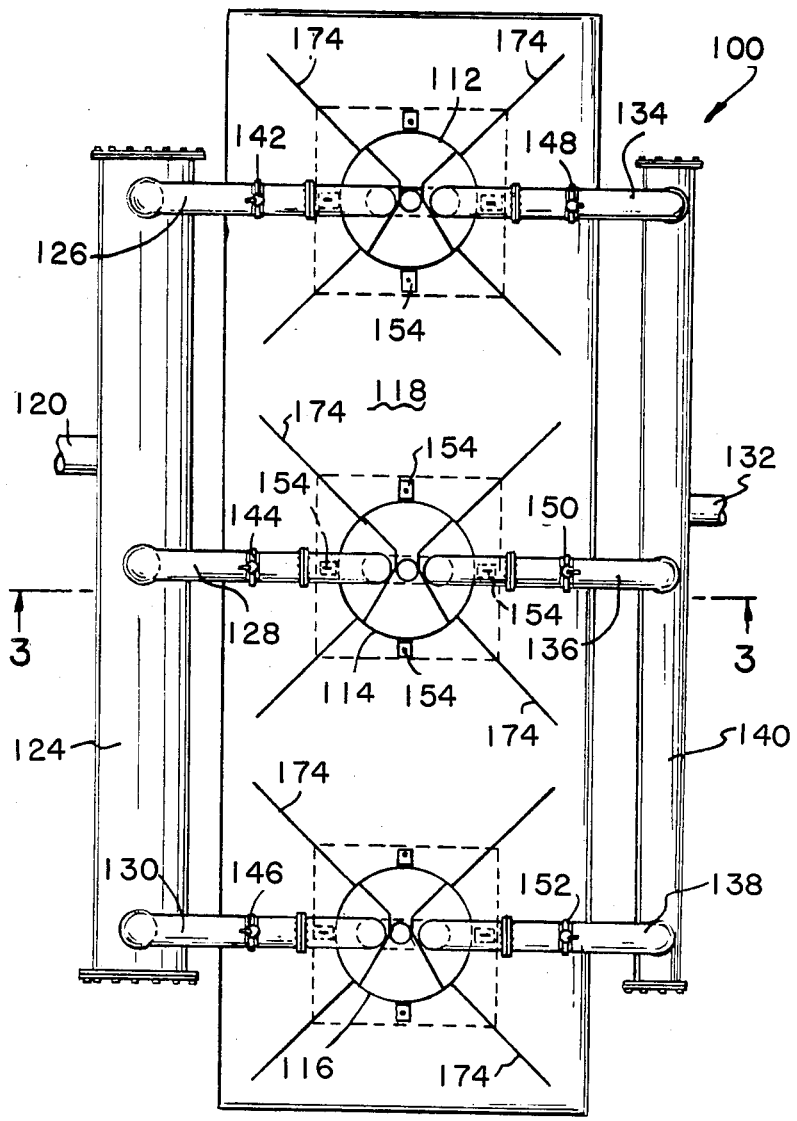
FIG. 2 is a top view of a cooling tower installation used in accordance with the present invention for removing oil particles and condensation from a pipeline carrying a stream of compressed air to snow-making equipment.

With reference to FIGS. 2 through 4, the cooling tower installation 100 of the present invention is illustrated. As shown in FIG. 2, the installation 100 comprises a plurality of cooling towers 112, 114 and 116 mounted on a concrete foundation 118 in a manner to be described in detail hereinbelow. The cooling towers 112, 114 and 116 are in communication with pipeline 120 via an intake distributor tank 124 and intake pipes 126, 128 and 130, respectively. Pipeline 120 receives a stream of compressed air from a source located downstream of the installation 100. While the installation illustrated in FIG. 2 includes three cooling towers it should be appreciated that the number of cooling towers employed may be of any desired number. The cooling towers 112, 114 and 116 are connected on their downstream side with pipeline 32 which delivers the stream of compressed air to the aftercooler and cryogenic unit via discharge pipes 134, 136 and 138, respectively, and discharge distributor 140. Each of the intake pipes 126, 128 and 130 are provided with valves 142, 144 and 146, respectively for selectively communicating compressed air from intake distributor tank 124 to any one or more of the cooling towers 112, 114 and 116. Valves 148, 150 and 152 are provided in each of the discharge pipes 134, 136 and 138 for selectively controlling the flow of fluid from the cooling towers 112, 114 and 116 for reasons to be made clear hereinbelow.

Referring now to FIG. 3, the structure of the cooling towers will be discussed in detail. Cooling tower 114 comprises a plurality of support legs 154 secured to the concrete foundation 118 by means of anchor bolts 156. In the preferred embodiment of the present invention four support legs 154 are employed, see FIG. 2, and may be made of steel or any other suitable material which is capable of supporting the cooling tower 114. Secured to the support legs 154 by means of bolts 156 is pipe 160 which forms the outer wall of the cooling tower 114. It is preferred, for reasons to be explained hereinbelow, that pipe 160 be an aluminum corrugated helical pipe, for example, the helical pipe sold by Kaiser Aluminum under the trademark CORLIX ®. A four sided aluminum hood 162 is secured to pipe 160 by means of brackets 164 and bolts 166. The hood 162 is provided with openings 168 on each of its sides so as to allow air to pass from the interior of the cooling tower 114 defined by pipe 160 to the exterior thereof. A compression ring 170 provided with a plurality of eyelets 172 is secured to the top of pipe 160 proximate to hood 162. Steel cable 174 extends from the eyelets 172 to anchor bolts 176 provided in concrete foundation 118 for further supporting pipe 160 of cooling tower 112. In the preferred embodiment four support cables are provided for each cooling tower and each support cable 174 is provided with a turnbuckle 178 for adjusting the tension of the cables 174. In the alternative steel rods or the like may be substituted for the cable-turnbuckle arrangement.

Secured within pipe 160 of cooling tower 114 by means of brackets, now shown, is a U-shaped aluminum transport pipe 180 for transporting a stream of compressed air through the cooling tower 114. As can best be seen in FIG. 4, pipe 180 may be provided with cooling fins 182 to assist in transferring heat between the exterior of pipe 180 and the interior 184 of cooling tower 114 as defined by pipe 160. The ends 186 and 186' of the transport pipe 180 are bent at an angle and project through openings 188 in pipe 160 and rest on support legs 154. Ends 186 and 186' of transport pipe 180 are connected to intake pipe 128 and discharge pipe 136, respectively, by means of couplings 190. Each of the discharge pipes 134, 136 and 138 are provided with throttles 192, as shown in FIG. 3, for restricting the flow of the stream of compressed air downstream of the cooling towers 112, 114 and 116. Upstream of the throttles 192 provided on end 186' of transport pipe 180 is a heating element 194 for heating that portion of the transport pipe 180 immediately upstream of throttle 192. Temperature sensing means 212 and 212' are provided on ends 186 and 186', respectively, for sensing the temperature of the stream of compressed air as it passes through pipe 180. Drain pipes 196, 198 and 200 are provided in the bottom of end 186 and 186' and intake distributor tank 124 for draining waste water and oil from the stream of compressed air into line 202 to discharge tank 204. Tank 204 is provided downstream thereof with an automatically actuated drain valve 206 which is actuated in response to the level of water and oil in tank 204. The level of water and oil in tank 204 may be sensed by any suitable means such as floats, electrodes or the like. A manual back up valve 208 is provided downstream of valve 206.

Provided at the bottom of corrugated pipe 160 and secured thereto by suitable means is a standard ring fan 210 for circulating ambient air up through the interior 184 of cooling tower 114 over the fins 182 of transport pipe 180 and out openings 168 provided in hood 162.

With references to FIGS. 1 through 4, the operation of the installation of the present invention will be discussed in detail.

Compressed air is supplied to pipeline 14 from a compressor 12 and is delivered to moisture separator 16. During the operation of the compressor 12 a certain amount of lubricating oil blows by the pistons of the operating compressor 12 making its way into pipeline 14. In addition, heat generated by the compressor 12 during the operation thereof results in a condensate forming in the pipeline 14 due to condensation. Eighty percent of the moisture in the stream of compressed air is removed in separator 16 and the partially moisture free stream is then delivered via line 18 to deliquescent air dryer 20 wherein the air is further dried. The compressed air stream is then carried via line 21 with the remaining condensate and oil particles in the stream of compressed air to intake distributor tank 124 of cooling installation 100. Intake distributor tank 124 distributes the stream of compressed air containing the condensate and oil particles to any one or more of the cooling towers provided in cooling installation 100 via intake pipes 126, 128 and 130. By selectively adjusting valves 142, 144 and 146 provided in intake pipes 126, 128 and 130, respectively, the stream of compressed air is directed to any one or more of the cooling towers 112, 114 and 116. With reference to FIG. 3, the operation of the cooling towers will be explained in detail. The stream of compressed air containing the condensate and oil particles is fed from intake pipe 128 to transport pipe 180 for carrying the stream of compressed air through the cooling tower 114. Fan 210 circulates ambient air through the interior 184 of cooling tower 114 in heat exchange relationship with pipe 180 and cooling fins 182. By providing a helical corrugated pipe 160 as the housing for the cooling tower 114, the ambient air circulates in a spiralling fashion up through the cooling tower 114 thereby providing an extremely efficient heat exchange relationship with the pipe 180 and cooling fins 182. As the stream of compressed air circulates through transport pipe 180 the condensate which is being cooled by the circulation of cold air through the cooling tower crystallizes and the oil particles in the air stream adhere to the crystallized vapor. As the crystallized condensate approaches the outlet end 186' of transport pipe 180, the stream of air is slowed as a result of the throttle 192 and discharge pipe 136. Adjustment of valve 150 in discharge pipe 136 may further slow the passage of the stream of compressed air. By throttling the flow of compressed air as described above the outlet end 186' of the pipe forms in effect a holding zone for the crystallized condensate. This zone 186' is provided with heating elements 194 for heating the holding zone so as to melt the crystallized condensate which, along with the oil particles, separates out from the stream of air under the force of gravity and is drained from the compressed air stream and is via lines 198 and 202, fed under pressure to a discharge tank 204 located, preferably, at the compressor station. Thus, the water and oil particles carried by the compressed air stream are effectively removed and the compressed air stream free of water and oil particles is carried via pipeline 22 to the aftercooler 24. Further drain pipes 196 and 200 are located upstream of the cooling towers to drain any oil or liquid which may form at those points. The waste water and oil collected in tank 204 is, as noted above, under pressure due to the compressed air stream. Suitable sensing means is provided in tank 204 to sense the accumulation of waste water and oil therein and to actuate drain valve 206 to open same so as to follow for periodic draining of tank 204. A manual back up valve 208 may be provided downstream of the automatic drain valve 206.

The compressed air stream which is free of water and oil particles is precooled in aftercooler 24 and is delivered via line 26 to cryogenic unit 30 where it is contacted with liquid nitrogen from source 28 so as to supercool the air The air leaving the cryogenic unit 30 is then mixed with the nitrogen leaving unit 30 and delivered to the snow-making equipment on the mountain.

As can be seen from the foregoing, in accordance with the present invention, effective removal of water and oil from a stream of compressed air is accomplished in a simple and economical manner. In addition, the present invention provides a method and apparatus for producing snow which is efficient and effective at marginal snow-making temperatures. By way of the present invention the problems heretofore encountered, namely, freeze-up of the snow-making equipment, contamination of the environment and inefficient snow-making are overcome.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an installation for snow-making wherein a stream of compressed air and a stream of compressed water are fed from a compressor station and a pumping station via separate lines to the nozzles of snow-making equipment where said compressed air and pressurized water are mixed to produce a stream of snow particles, a method for removing condensate and oil particles from said stream of compressed air and supercooling said stream of air comprising:

providing a stream of compressed air having oil particles and a condensate therein;

cooling said stream of compressed air so as to crystallize said condensate and allow said oil particles to adhere thereto;

heating said crystallized condensate and said oil particles in a holding zone so as to liquefy said crystallized condensate;

separating out said liquid and oil particles from said stream of compressed air;

feeding said stream of compressed air free of said liquid and oil particles to a cryogenic unit; and passing a liquefied gas through said cryogenic unit in heat exchange relationship with said compressed air so as to supercool said stream of compressed air.

2. A method according to claim 1 further including removing said liquefied gas from said cryogenic unit and mixing said removed liquefied gas with said supercooled stream of compressed air.

3. A method according to claim 1 further including throttling said stream of compressed air so as to form said holding zone.

4. In an installation for snow-making wherein a stream of compressed air and a stream of compressed water are fed from a compressor station and a pumping station via separate lines to the nozzles of snow-making equipment where said compressed air and pressurized water are mixed to produce a stream of snow particles, a method for removing condensate and oil particles from said stream of compressed air and supercooling said stream of air comprising:

providing a stream of compressed air having oil particles and a condensate;

separating out said oil particles and condensate from said stream of compressed air;

feeding said stream of compressed air free of said oil particles and condensate to a cryogenic unit; and passing a liquefied gas through said cryogenic unit in heat exchange relationship with said compressed air so as to supercool said stream of compressed air.

5. A method according to claim 4 further including removing said liquefied gas from said cyrogenic unit and mixing said removed liquefied gas with said supercooled stream of compressed air.

6. In an installation for making snow wherein a stream of compressed air and a stream of pressurized water are fed from a compressor station and a pumping station via separate lines to the nozzles of snow-making equipment where said compressed air and pressurized water are mixed to produce a stream of snow particles comprising:

conduit means for feeding a stream of compressed air from said compressor station to said snow-making equipment;

cooling means associated with said conduit and positioned upstream of said snow-making equipment for cooling the stream of compressed air so as to crystallize the condensate and allow the oil particles to adhere thereto;

means downstream of said cooling means for holding the crystallized condensate and oil particles in a holding zone;

heating means associated with said holding zone for heating said holding zone so as to liquefy the condensate;

means for separating said liquefied condensate and oil particles from said compressed air stream in said holding zone;

a cryogenic unit downstream of said holding zone for receiving said stream of compressed air; and a source of liquefied gas in fluid communication with said cryogenic unit so as to pass said liquefied gas in heat exchange relationship with said stream of compressed air in said cryogenic unit so as to supercool said stream of compressed air.

7. An apparatus according to claim 6 further including conduit means associated with said cryogenic unit and said stream of compressed air for mixing said liquefied gas removed from said cryogenic unit with said supercooled stream of compressed air downstream of said cryogenic unit.

8. An apparatus according to claim 6 wherein said means downstream of said cooling means for holding the crystallized condensate and oil particles in a holding zone comprises a throttle.

9. An apparatus according to claim 6 wherein said cooling means comprises at least one cooling tower having a pipe enclosing a portion of said conduit means and further includes means for circulating air through said pipe over said conduit means.

10. An apparatus according to claim 9 wherein said pipe is a corrugated helical pipe.

11. An apparatus according to claim 10 wherein said pipe is made of aluminum.

12. An apparatus according to claim 9 wherein said means for circulating said air comprises a fan.

13. An apparatus according to claim 9 wherein the portion of the conduit means enclosed by said pipe is provided with cooling fins.

14. An apparatus according to claim 6 wherein valve means are provided downstream and upstream of said cooling means for controlling the flow of the stream of compressed air through said cooling means.

15. An apparatus according to claim 6 wherein drain means communicates with said holding zone for draining said liquefied condensate and oil to a holding tank.

16. An apparatus according to claim 15 wherein said holding tank includes means for sensing the level of water and oil in said tank.

17. An apparatus according to claim 16 wherein valve means is provided downstream of said holding tank for draining said water and oil therefrom upon the sensing by said sensing means of a predetermined height of water and oil in said tank.

18. An apparatus according to claim 9 wherein a plurality of cooling towers are arranged in parallel.

19. In an installation for making snow wherein a stream of compressed air and a stream of pressurized water are fed from a compressor station and a pumping station via separate lines to the nozzles of snow-making equipment where said compressed air and pressurized water are mixed to produce a stream of snow particles comprising:

conduit means for feeding a stream of compressed air from said compressor station to said snow-making equipment;

means associated with said conduit and positioned upstream of said snow-making equipment for removing condensate and oil particles from said stream of compressed air;

a cryogenic unit downstream of said means for removing said condensate and oil particles for receiving said stream of compressed air; and a source of liquefied gas in fluid communication with said cryogenic unit so as to pass said liquefied gas in heat exchange relationship with said stream of compressed air in said cryogenic unit so as to supercool said stream of compressed air.

20. An apparatus according to claim 19 further including conduit means associated with said cryogenic unit and said stream of compressed air for mixing said liquefied gas removed from said cryogenic unit with said supercooled stream of compressed air downstream of said cryogenic unit.

* * * * *